United States Patent Office 3,398,546
Patented Aug. 27, 1968

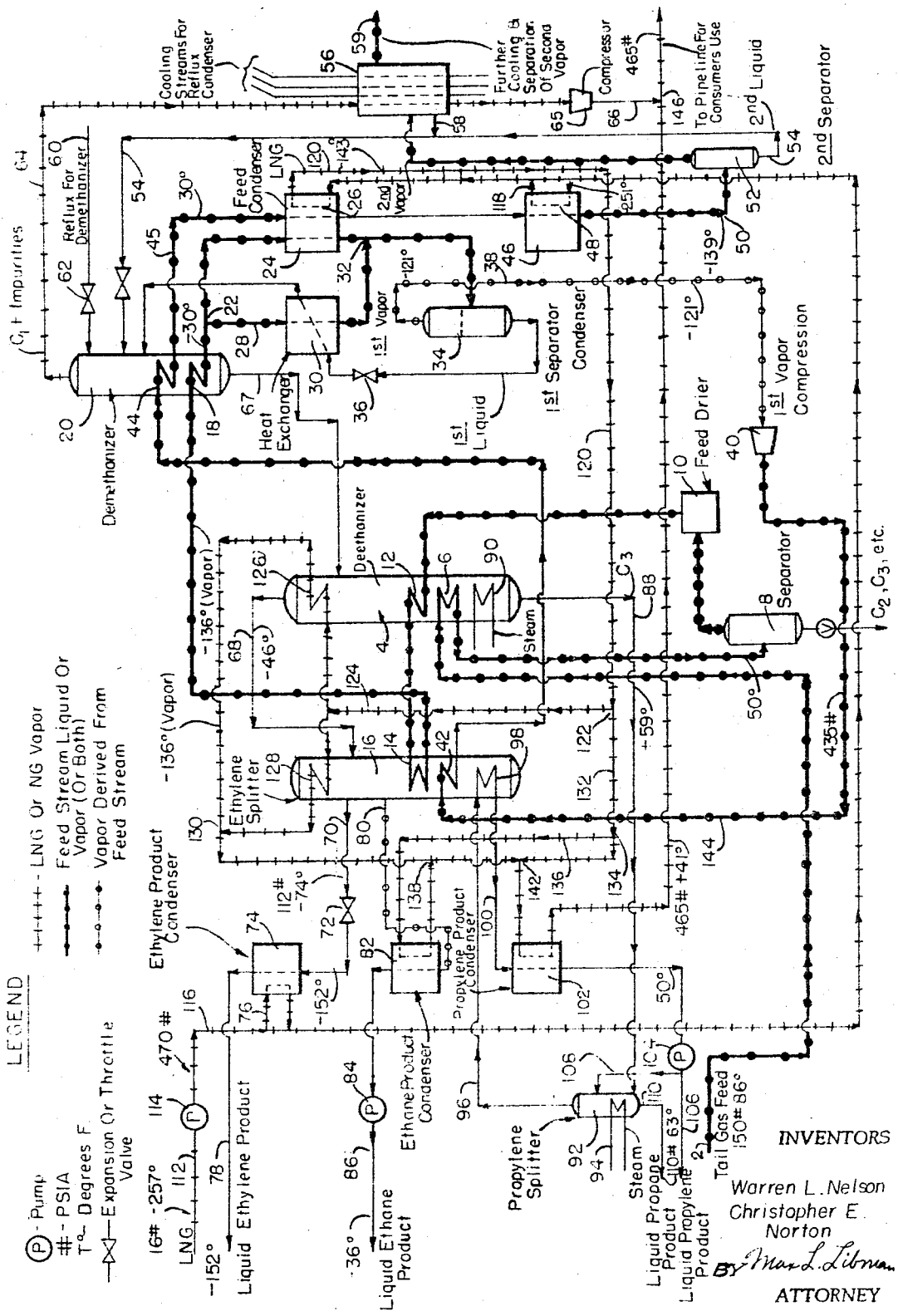

3,398,546
TAIL GAS SEPARATION IN PLURAL STAGES EMPLOYING LIQUID NATURAL GAS REFRIGERANT
Warren L. Nelson, Montreal, Quebec, Canada, and Christopher E. Norton, London, England, assignors to Conch International Methane Limited, Nassau, the Bahamas, a Bahamian company
Filed Feb. 4, 1966, Ser. No. 525,080
Claims priority, application Canada, Mar. 19, 1965, 926,039
4 Claims. (Cl. 62—28)

ABSTRACT OF THE DISCLOSURE

A process for separating fractions of hydrocarbons from a gaseous mixture, such as a refinery tail gas containing hydrogen, initially at a super-atmospheric pressure, and at the same time gasifying liquid natural gas by heat exchanging it with the tail gas to initially condense out some of the hydrocarbons, compressing the uncondensed gas to a higher pressure and further cooling it with liquid natural gas to separate out further portions of hydrocarbon.

---

This invention relates to the separation of a gaseous mixture into its components, and more particularly, it relates to such separation utilizing the refrigeration potential in liquefied natural gas (LNG).

The separation of a mixture of gases has usually involved compression to a high pressure, then refrigeration to condense a liquid phase, and then judicious reboiling and condensation in distillation columns to separate the liquid into its various components. Considerable power has been required for initial compression of the gaseous mixture, and also for the refrigeration capacity necessary in prior art separation installations.

It is therefore an object of the present invention to reduce the amount of power required at a separation installation to condense a proportion of a gaseous mixture. To this end the invention, in one of its aspects, comprises a process for separating fractions of hydrocarbons from a gaseous mixture which comprises
(a) introducing said gaseous mixture at a first superatmospheric pressure,
(b) then cooling said compressed gaseous mixture, by indirect heat exchange with liquid natural gas, to a first temperature sufficiently low to condense a substantial proportion of the hydrocarbons in said gaseous mixture,
(c) separating the condensed hydrocarbons from the uncondensed portion of said gaseous mixture,
(d) compressing said uncondensed portion to a second pressure higher than said first pressure,
(e) recooling, by indirect heat exchange with liquid natural gas, said compressed uncondensed portion to a second temperature sufficiently low to condense a further portion of hydrocarbons,
(f) and separating said further portion of hydrocarbons from the uncondensed gas remaining after said step (e).

Other objects and advantages of the present invention will appear from the following description, in which the specific arrangement illustrated is provided by way of example only, the scope of the invention being defined by the appended claims.

In the drawing there is shown a flow sheet illustrating the present invention. This flow sheet actually illustrates a portion of a separation unit used in a refinery tail gas separation system and reference may be made to the same inventors' copending application, Canadian Ser. No. 926,-040 filed Mar. 19, 1965, for "Separation of a Refinery Tail Gas," for the details of the separation unit and overall system not shown or described in the present discussion.

The gaseous mixture to be separated according to the present invention will typically be a refinery tail gas. A typical refinery tail gas may comprise 20% hydrogen, 5% carbon monoxide and nitrogen, 40% methane, 5% ethylene, 15% ethane, 5% propylene, 9.5% propane, 0.5% butane and constituents heavier than butane. It will be understood that the temperatures, pressures and compositions referred to throughout this description are not intended to be precise, but are illustrative only, for facilitating understanding of the present invention.

As will be described in detail shortly, the gaseous mixture to be separated, also termed a feed stream, undergoes successive coolings which condense fractions of the feed stream into liquid, and these liquids are then separated from the feed stream. For ease in following the drawing, conduits carrying the vapor portion of the feed stream, or mixed vapor-liquid portions of the feed stream (but not liquids separated from the feed stream) have been shown as lines with dots superimposed thereon. Conduits carrying LNG or natural gas vapor (assumed, as will usually be the case, to be virtually pure methane) or any other stream, liquid or vapor, consisting predominantly of methane have been shown as lines with cross dashes superimposed thereon. Conduits carrying vapor derived from the feed stream have been shown as lines of dots. All other conduits have been shown as plain lines.

Referring now to the drawing, a refinery tail gas is introduced to the separation unit via a conduit 2, typically at a pressure of 150 p.s.i.a. (pounds per square inch, absolute) and a temperature of 86° F. This is commonly the temperature and pressure at which the tail gas is available from the refinery, no special cooling or compression of the tail gas being performed between its leaving the refinery and its entering the separation unit shown in the drawing.

The tail gas feed entering the separation unit via conduit 2 is first conducted to a deethanizer 4 where it enters a reboil coil 6 to provide reboil for the deethanizer and is cooled in the process, typically to about 50° F. The cooled gas leaving coil 6 is conducted to a separator 8 where any condensed liquids are drained off, and it is then conducted to a feed drier 10 for drying. It may be noted that because the feed gas is cooled before being dried, the feed drier 10 can be of smaller size than would be necessary were the feed gas brought into the drier at its original temperature of +86° F.

The dried feed stream is next conducted to another reboil coil 12 of the deethanizer 4, then to a reboil coil 14 of an ethylene splitter 16 and then to a reboil coil 18 of a demethanizer 20, cooling and some condensation of the feed stream occurring along this path. After leaving coil 18 the feed stream, now at a temperature of about −30° F. splits at point 22 into two parts, the bulk of the feed stream passing through a feed condenser 24 where it is cooled by indirect heat exchange with LNG in a coil 26. A small part of the feed stream is conducted via conduit 28 through a heat exchanger 30 where some cooling occurs and this small part then joins the main feed stream at point 32, the temperature of the combined feed stream at this point being approximately −121° F.

At this point the feed stream has been cooled sufficiently so that a considerable portion of it has condensed (about a third) and the feed stream now enters a first separator 34 where the liquid and gaseous portions are separated, the liquid portion now being termed a first liquid and the gaseous portion being termed a first vapor. The separation at this point is a rough one between ethylene and the heavier components of the feed stream in the first liquid on the one hand, and the lighter components of the feed stream (i.e. methane, hydrogen, nitrogen and carbon monoxide) in the first vapor, on the other hand. Since this first separation is only a rough one, the first vapor still contains substantial portions of ethylene and heavier components while the first liquid contains some methane, nitrogen, hydrogen, and carbon monoxide.

The first liquid leaving the bottom of separator 34 is expanded through a valve 36, passes through heat exchanger 30 to cool the portion of the feed stream passing therethrough, and then enters demethanizer 20 for further separation, as will be described later.

The first vapor leaving the top of separator 34 (still at about −121° F.) passes through conduit 38 to a compressor 40 where it is compressed to high pressure (approximately 435 p.s.i.a.) and is heated in the process of compression to close to ambient temperature. It should be noted that the vapor stream entering compressor 40 is considerably less in flow than the original tail gas feed stream entering the separation unit (about one third of the original stream having been condensed as mentioned) and is also much cooler than the original tail gas feed. Therefore, considerably less power is required for compressor 40 than would be required if the entire tail gas feed from the refinery were being compressed, as has commonly been the practice in the past.

From compressor 40 the first vapor is conducted to a reboil coil 42 of ethylene splitter 16. After being cooled slightly in reboil coil 42, the first vapor is conducted to a reboil coil 44 of the demethanizer 20 where it is cooled further (to a temperature of about −30° F.) and then conducted via a conduit 45 to feed condenser 24 where it is cooled by indirect heat exchange LNG in coil 26 to a temperature of approximately −121° F. The first vapor next passes through a first vapor condenser 46 where it is further cooled by indirect heat exchange with LNG in coil 48 to a temperature of about −139° F. As the first vapor passes through the successive coolings mentioned, about one quarter of its volume condenses, and accordingly, after leaving the first vapor condenser 46, the first vapor passes via conduit 50 into a second separator 52 where the liquid (termed a second liquid) and the vapor (termed a second vapor) are separated.

The second liquid, containing most of the ethylene and heavier components contained in the first vapor (but also containing some methane and lighter components), passes through conduit 54 and is expanded into the demethanizer 20 for further separation. The second vapor, consisting mainly of lighter components such as methane and hydrogen, but still with some heavier components such as ethylene and indirect heat exchange with various streams passing through the reflux condenser.

In the reflux condenser, nearly all components of the second vapor heavier than and including ethylene are liquefied, and these liquefied components are conducted via conduit 58 to conduit 54 through which these components then pass to be expanded into the demethanizer 20, together with the second liquid from separator 52.

One of the cooling streams passing through the reflux condenser 56 is fully illustrated (i.e. the stream in conduit 64) and will be described presently. The other cooling streams employed in the reflux condenser 56 are marked in the drawing merely as "cooling streams for reflux condenser." The exact nature of these cooling streams is not important for purposes of the present example, so long as they serve to condense ethylene and heavier components from the second vapor and leave most of the methane and lighter components in vapor form. These other cooling streams may conveniently comprise a cold natural gas vapor stream and streams of methane mixed with impurities, as explained in the copending application previously referred to.

The second vapor leaves the top of the reflux condenser 56 via conduit 59, at a temperature of approximately −184° F. and consisting mainly of hydrogen and methane. In fact, the second vapor still contains about 58% of the methane originally present in the refinery tail gas feed (the remainder having been condensed in the first and second liquids and in the reflux condenser and then directed to the demethanizer for separation). The second vapor leaving the top of reflux condenser 56 also contains about 80% of the nitrogen and carbon monoxide originally present in the feed stream.

Further cooling of the second vapor next occurs, in order to condense a further liquid fraction (consisting mostly of methane) and leave the second vapor as primarily a hydrogen gas stream contaminated by nitrogen and carbon monoxide. The hydrogen gas stream will then be purified by scrubbing out the nitrogen and carbon monoxide impurities with LNG, and then by further scrubbing (commonly with propane) to remove methane impurities. These procedures are not part of the present invention, and since they are fully described in the patent application mentioned, to which reference may be made, they will not be described here.

The various product stream derived from the liquids condensed from the feed stream will next be described. Considering first the demethanizer 20, reflux is provided for the demethanizer by a stream of LNG passing through conduit 60 and being expanded through valve 62. This LNG may conveniently be a portion of the contaminated LNG obtained after LNG has been used to scrub impurities from the hydrogen gas stream derived from further separation of the second vapor, as mentioned.

A stream of gaseous methane, with some hydrogen, carbon monoxide and nitrogen impurities, leaves the top of demethanizer 20 via conduit 64 and passes through reflux condenser 56 to assist in removing components heavier than methane from the second vapor. This methane stream in conduit 64 is quite suitable for use as natural gas, and accordingly after use in the reflux condenser, it may be compressed to pipeline pressure (commonly about 465 p.s.i.a.), in compressor 65 and delivered via conduit 66 to a pipeline (not shown) for consumer use.

Returning to the demethanizer 20, a stream of ethylene, ethane, propylene, propane and heavier constituents leaves the bottom of the demethanizer via conduit 67, at a temperature of about −40° F., and enters the deethanizer 4 as feed. Ethylene and ethane leave the top of the deethanizer via conduit 68 at a temperature of about −46° F. and pass into the ethylene splitter 16 where separation occurs. Ethylene vapor leaves near the top of ethylene splitter 16 via conduit 70, being at a pressure of about 112 p.s.i.a. and a temperature of about −74° F. This ethylene vapor is expanded through valve 72 to a pressure of about 16 p.s.i.a., thereby being cooled to its dew point of about −152° F. The gaseous ethylene stream then passes through an ethylene product condenser 74 where it is condensed against a high pressure LNG stream entering the ethlene product condenser via a conduit 76. The liquid ethylene product then leaves the separation unit, at a temperature of about −152° F., via conduit 78.

Returning again to the ethylene splitter 16, ethane gas leaves near the bottom of the ethylene splitter via conduit 80, the ethane gas being at a pressure of about 115 p.s.i.a. and a temperature of about −38° F. The ethane gas in conduit 80 is condensed in an ethane product condenser 82 against vaporizing LNG entering the ethane product condenser, and the liquid ethane, at a temperature of about −38° F., is next conducted to an ethane pump 84 by which it is pumped to a pressure of about 465 p.s.i.a. for consumer use. This high pressure liquid ethane product, now at a temperature of about −36° F., then leaves the separation unit via conduit 86.

Returning to the deethanizer 4, propane and propylene leave the bottom of the deethanizer via a conduit 88 at a temperature of about +59° F. (further reboil for the deethanizer is provided by steam in reboil coil 90). The propane and propylene in conduit 88 are injected into a propylene splitter 92 where separation between the propylene and propane occurs, reboil for the propylene splitter being provided by steam in reboil coil 94. Propylene gas leaves the top of propylene splitter 92 via conduit 96 at a pressure of about 106 p.s.i.a. and a temperature of about +50° F. The propylene gas in conduit 96 is conducted to a reboil coil 98 of ethylene splitter 16 where some of the propylene is condensed in providing reboil for the ethylene splitter. The mixed liquid vapor stream of propylene, still at about +50° F., leaves reboil coil 98 via conduit 100 and enters a propylene product condenser 102 where all of the remaining propylene vapor is condensed against vaporizing LNG entering condenser 102. The condensed propylene, at a temperature of about +50° F., travels from the propylene product condenser to pump 104 where it is pumped to a pressure of about 147 p.s.i.a. From the pump 104 some of the liquid propylene product leaves the separation unit as product via conduit 106 while the remainder is conducted through conduit 108 into the top of the propylene splitter 92 to provide reflux.

Liquid propane leaves the bottom of the propylene splitter 92 via conduit 110 at a pressure of about 110 p.s.i.a. and a temperature of about 63° F. Most of this propane product is removed from the separation unit as product, but some may be used for scrubbing methane from the hydrogen stream derived from the second vapor, as has been mentioned. This feature is not illustrated or described since it does not form a part of the present invention.

The LNG cycle in the separation unit will next be explained in more detail. LNG enters the unit from storage, via a conduit 112, at a temperature of about —257° F. and a pressure of about 16 p.s.i.a. This liquid is pumped to high pressure (470 p.s.i.a.) by pump 114, and then enters conduit 116. A little LNG is removed from conduit 116, via conduit 76, to condense ethylene in the ethylene product condenser 74, as previously explained, and this LNG is then returned to conduit 116.

The LNG in conduit 116 next travels to the first vapor condenser 46, where part of the LNG stream, at a temperature of about —251° F., is removed and passes through coil 48 to assist in condensing the first vapor by indirect heat exchange. The LNG leaves coil 48 at a temperature of about —175° F., still in liquid form, and rejoins at point 118 the remainder of the LNG stream in conduit 116. From point 118 the recombined LNG streams travel to coil 26 of feed condenser 24 where they cool both the first vapor in conduit 45 and also the main feed stream just prior to its separation into a first liquid and a first vapor. The LNG leaves feed condenser 24 via conduit 120, now at a temperature of about —143° F., and still in liquid form.

The LNG stream in conduit 120 next divides at point 122, about two-thirds of the stream passing through conduit 124 into reflux coils 126 and 128 of the deethanizer 4 and the ethylene splitter 16 respectively. In these coils the LNG vaporizes to provide reflux for the deethanizer and the ethylene splitter, and the resulting LNG vapor streams rejoin at point 130, now at a temperature of about —136° F.

The remaining portion of the LNG liquid stream at point 122 passes through conduit 132 to another branch point 134 where about half of this stream separates and passes through conduit 136 to the ethane product condenser 82 where it is vaporized to condense ethane product as has been mentioned. Natural gas vapor leaves ethane product condenser 82 and rejoins at point 138 the natural gas vapor stream flowing from point 130. The resultant natural gas vapor stream from point 138 flows through conduit 140 to point 142 where it joins the liquid natural gas stream flowing upwardly (as shown in the drawings) from point 134. A combined liquid vapor stream of natural gas flows from point 142 through the propylene product condenser 102 where the liquid portion of the natural gas stream is vaporized and the natural gas vapor is heated against condensing propylene product, as has been explained. The warmed natural gas vapor stream leaves propylene product condenser 102, via conduit 144, at a temperature of about +41° F. and a pressure of about 465 p.s.i.a. The natural gas vapor in conduit 144 joins the impure methane stream in conduit 66 at point 146, and the combined streams may then be conducted to a pipeline (not shown) for consumer use.

Any references in this description to the composition of a stream, or to the proportions in which a stream divides, or the like, are in terms of volume, and if a liquid is being referred to, the reference is in terms of its gaseous equivalent, all measured at a standard temperature and pressure.

It will be apparent that the embodiments shown are only exemplary and that various modifications can be made in construction and arrangement within the scope of our invention as defined in the appended claims.

What we claim is:

1. A process for separating fractions of hydrocarbons from a gaseous mixture such as a refinery tail gas containing hydrogen and $C_2$ hydrocarbons, which comprises the steps of
   (a) introducing said tail gas mixture at a first superatmospheric pressure,
   (b) cooling said gaseous mixture at super-atmospheric pressure, by indirect heat exchange in a deethanizer column, to a first temperature sufficiently low to condense an initial proportion of the hydrocarbons in said gaseous mixture,
   (c) separating the initially condensed hydrocarbons from the uncondensed portion of said gaseous mixture, then further cooling said uncondensed portion by indirect heat exchange in said deethanizer, an ethylene splitter, a demethanizer and by indirect heat exchange with liquid natural gas to a low temperature sufficient to condense a substantial first portion of hydrocarbons containing a substantial portion of $C_2$ hydrocarbons,
   (d) separating the condensed substantial first portion of hydrocarbons from first uncondensed portion of gaseous mixture,
   (e) compressing said first uncondensed portion of gaseous mixture to a second pressure higher than said first pressure,
   (f) recooling, by indirect heat exchange with liquid natural gas, said compressed uncondensed first portion to a second temperature sufficiently low to condense a further portion of hydrocarbons, said further portion of hydrocarbons containing a substantial portion of $C_2$ hydrocarbons,
   (g) separating said further portion of hydrocarbons from the uncondensed gas remaining after said step (f),
   (h) introducing liquids from both of the separations of steps d and g into said demethanizer,
   (i) passing liquid natural gas in indirect heat exchange with the overhead vapor in said deethanizer and said ethylene splitter,
   (j) separating said $C_2$ hydrocarbons by fractional distillation from the remaining hydrocarbons condensed in said steps (c) and (f),
   (k) said fractional distillation including indirect heat exchange with a stream of evaporating liquid natural gas to form a reflux, said stream of liquid natural gas including the liquid natural gas used in steps (c) and (f) after its use in such steps.

2. A process according to claim 1 wherein prior to said step (c), said gaseous mixture is cooled to a temperature above that necessary to condense a substantial portion of said hydrocarbons in said mixture and is then dried.

3. A process according to claim 1 wherein, prior to said step (c) said gaseous mixture is cooled by indirect heat exchange with hydrocarbons condensed in at least one of said steps (c) and (f).

4. A process for separating fractions of hydrocarbons from a gaseous mixture such as a refinery tail gas which contains $C_2$ hydrocarbons, which comprises the steps of (a) introducing said gaseous mixture at a first superatmospheric pressure;
(b) cooling said gaseous mixture by heat exchange in a reboiler coil of a deethanizer;
(c) further cooling said compressed gaseous mixture, by indirect heat exchange with liquid natural gas in a first heat exchanger to a first temperature sufficiently low to condense a substantial proportion of the hydrocarbons containing substantial $C_2$ hydrocarbons from said gaseous mixture;
(d) separating the condensed hydrocarbons from the uncondensed portion of said gaseous mixture;
(e) compressing said uncondensed portion to a second pressure higher than said first pressure;
(f) cooling said compressed uncondensed portion in a reboiler coil in an ethylene splitter;
(g) further cooling, by indirect heat exchange with liquid natural gas, said compressed uncondensed portion to a second temperature sufficiently low to condense a further portion of hydrocarbons containing substantial $C_2$ hydrocarbons;
(h) separating said further portion of hydrocarbons from the uncondensed gas remaining after step (g);
(i) introducing liquids from both of the separations of steps (d) and (h) into a demethanizer;
(j) passing liquid natural gas in indirect heat exchange with the overhead vapor in said deethanizer and said ethylene splitter;
(k) separating said $C_2$ hydrocarbons by fractional distillation from the remaining hydrocarbons condensed in said steps (c) and (g);
(l) said fractional distillation including indirect heat exchange with a stream of liquid natural gas of evaporating liquid natural gas to form a reflux, said stream of liquid natural gas including the liquid natural gas used in steps (c) and (g) after its use in such steps.

References Cited

UNITED STATES PATENTS

| | | | |
|---|---|---|---|
| 1,266,621 | 5/1918 | Peterson | 62— 26 X |
| 1,850,529 | 3/1932 | Bottoms | 62—27 |
| 2,274,094 | 2/1942 | Rupp | 62—23 X |
| 2,880,592 | 4/1959 | Davison et al. | 62—23 |
| 3,073,129 | 1/1963 | Grenier | 62—28 |
| 3,119,677 | 1/1964 | Moon et al. | 62—23 |
| 3,186,182 | 6/1965 | Grossmann et al. | 62—23 |
| 3,319,428 | 5/1967 | Isaacson | 62—26 X |

FOREIGN PATENTS

| | | |
|---|---|---|
| 975,628 | 11/1964 | Great Britain. |
| 1,158,535 | 12/1963 | Germany. |

NORMAN YUDKOFF, *Primary Examiner.*

V. W. PRETKA, *Assistant Examiner.*